US012443135B2

(12) United States Patent
Kawatsu

(10) Patent No.: US 12,443,135 B2
(45) Date of Patent: Oct. 14, 2025

(54) IMAGE FORMING DEVICE

(71) Applicant: Konica Minolta, Inc., Toyko (JP)

(72) Inventor: Kenji Kawatsu, Kodaira (JP)

(73) Assignee: KONICA MINOLTA INC., Tokyo (JP)

( * ) Notice: Subject to any disclaimer, the term of this patent is extended or adjusted under 35 U.S.C. 154(b) by 155 days.

(21) Appl. No.: 17/731,910

(22) Filed: Apr. 28, 2022

(65) Prior Publication Data

US 2022/0350286 A1 Nov. 3, 2022

(30) Foreign Application Priority Data

Apr. 30, 2021 (JP) ................................ 2021-077344

(51) Int. Cl.
*G03G 21/20* (2006.01)
*G03G 15/00* (2006.01)

(52) U.S. Cl.
CPC ......... *G03G 15/657* (2013.01); *G03G 21/206* (2013.01); *G03G 2215/00616* (2013.01); *G03G 2215/00675* (2013.01); *G03G 2215/00679* (2013.01); *G03G 2221/1645* (2013.01)

(58) Field of Classification Search
CPC ............... G03G 15/657; G03G 21/206; G03G 2215/00616; G03G 2215/00675; G03G 2215/00679; G03G 2221/1645; B41J 29/377
See application file for complete search history.

(56) References Cited

U.S. PATENT DOCUMENTS

2006/0056885 A1* 3/2006 Takiguchi .......... G03G 15/1685 399/310
2014/0022571 A1* 1/2014 Ishizaki ............... H04N 1/6044 358/1.9
2017/0277106 A1* 9/2017 Baba .................. G03G 15/6585
2021/0250448 A1* 8/2021 Ando ................ H04N 1/00082

FOREIGN PATENT DOCUMENTS

JP 2003098764 A 4/2003
JP 2017-109843 * 6/2017

* cited by examiner

*Primary Examiner* — Thomas A Morrison
(74) *Attorney, Agent, or Firm* — CANTOR COLBURN LLP

(57) ABSTRACT

An image forming device includes: a conveyance path that conveys a printing medium; an image former that is arranged in a first place in the middle of the conveyance path, forms an image on one surface of the printing medium, and fixes the formed image by heating; a cooler that is arranged in a second place downstream in a conveyance direction from the first place in the middle of the conveyance path, and cools the printing medium by blowing air for cooling to the printing medium; and a reader that is arranged in a third place downstream in the conveyance direction from the second place in the middle of the conveyance path, and reads the image formed on the printing medium, wherein between the first place and the second place of the conveyance path, one or a plurality of guide members is provided, and a guide member is not provided.

12 Claims, 2 Drawing Sheets

IMAGE FORMING DEVICE

CROSS REFERENCE TO PRIOR APPLICATIONS

The present invention claims priority under 35 U.S.C. § 119 to Japanese patent Application No. 2021-077344, filed on Apr. 30, 2021, the entire content of which is incorporated herein by reference.

BACKGROUND

Technological Field

The present invention relates to an image forming device, and especially relates to a technology provided with an image sensor or a colorimeter applied when reading a formed image.

Description of the Related Art

In an image forming device, when printing is performed on a printing medium such as paper and a film, an image printed on the printing medium is read by a scanner and the like and read image data is compared with print original data for inspecting whether printing is correctly performed.

As such an inspection, for example, an entire printed image is read by the scanner, and it is determined whether the printing is appropriate such as whether there is a stain on the printed image or whether an amount of adhered ink is correct. When the inspection is performed by the scanner, a color of at least a part of the printed image is measured by a colorimeter, and the color of the data read by the scanner is calibrated based on the color measured by the colorimeter, so that color inspection of the image read by the scanner is correctly performed.

JP 2003-98764 A discloses a technology of cooling continuous paper with a cooling fan after a fixing step in an image forming device that prints on both sides of the continuous paper.

Note that, when an image is formed by an image forming device, it is necessary to fix a toner image formed on a printing medium at a heat fixing step. When performing this fixing step, it is necessary to heat a printed image to high temperature. Here, when reading the formed image by a scanner and the like to perform inspection at a step after the image is formed as described above, it is preferable to inspect the image on the printing medium temperature of which returns to normal temperature. Specifically, since a thermochromism phenomenon in which a color changes depending on the temperature of the printing medium occurs, reading at normal temperature is necessary for accurately inspecting the color. A scanner and a colorimeter that form a reader have a usable temperature range and reading at high temperature is not preferable.

Therefore, when the image formed by the image forming device is read by the scanner and the like, it is preferable to read after the temperature of the printing medium returns to the normal temperature. Therefore, for example, as disclosed in JP 2003-98764 A, it is conceivable to actively cool the continuous paper by cooling the continuous paper that passes through a fixing unit of the image forming device with a cooling fan. As a configuration for cooling the printing medium among configurations other than providing the cooling fan, for example, it is known to arrange a roller made of metal on a conveyance path of the printing medium and cool the printing medium by contact with the roller.

In contrast, as another problem caused by heating of the printing medium at the fixing step, it is known that the heated printing medium comes into contact with a roller arranged on the conveyance path, thereby causing deterioration such as unevenness on the printed image. That is, after being heated at the fixing step, an image forming surface comes into contact with the roller before temperature is lowered to temperature at which wax contained in toner is cured, so that the deterioration such as unevenness might occur on the printed image.

Therefore, in order to prevent image deterioration after the printing medium passes through the fixing unit, it is not preferable that the image forming surface comes into contact with the roller on the conveyance path until the temperature of the printing medium returns to the normal temperature. However, for example, as in a configuration of a printer disclosed in JP 2003-98764 A, a large number of rollers are usually arranged on the conveyance path of the printing medium. Therefore, the conventional printer is configured such that the image forming surface comes into contact with the roller even immediately after the printing medium passes through the fixing unit, and the printing medium comes into contact with the roller, so that deterioration in image quality to a certain degree cannot be avoided.

SUMMARY

An object of the present invention is to provide an image forming device capable of appropriately reading an image after image formation and preventing deterioration of an image formed on a printing medium after fixing.

To achieve the abovementioned object, according to an aspect of the present invention, an image forming device reflecting one aspect of the present invention comprises: a conveyance path that conveys a printing medium; an image former arranged in a first place in the middle of the conveyance path, the image former that forms an image on one surface of the printing medium and fixes the formed image by heating; a cooler arranged in a second place downstream in a conveyance direction from the first place in the middle of the conveyance path, the cooler that cools the printing medium by blowing air for cooling to the printing medium; and a reader arranged in a third place downstream in the conveyance direction from the second place in the middle of the conveyance path, the reader that reads the image formed on the printing medium by the image former, wherein between the first place and the second place of the conveyance path, one or a plurality of guide members that comes into contact with the other surface of the printing medium is provided, and a guide member that comes into contact with the one surface of the printing medium is not provided.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention (hereinafter, referred to as "this example") will be described with reference to the drawings. However, the scope of the invention is not limited to the disclosed embodiments.

[Entire Configuration]

Figure 1:
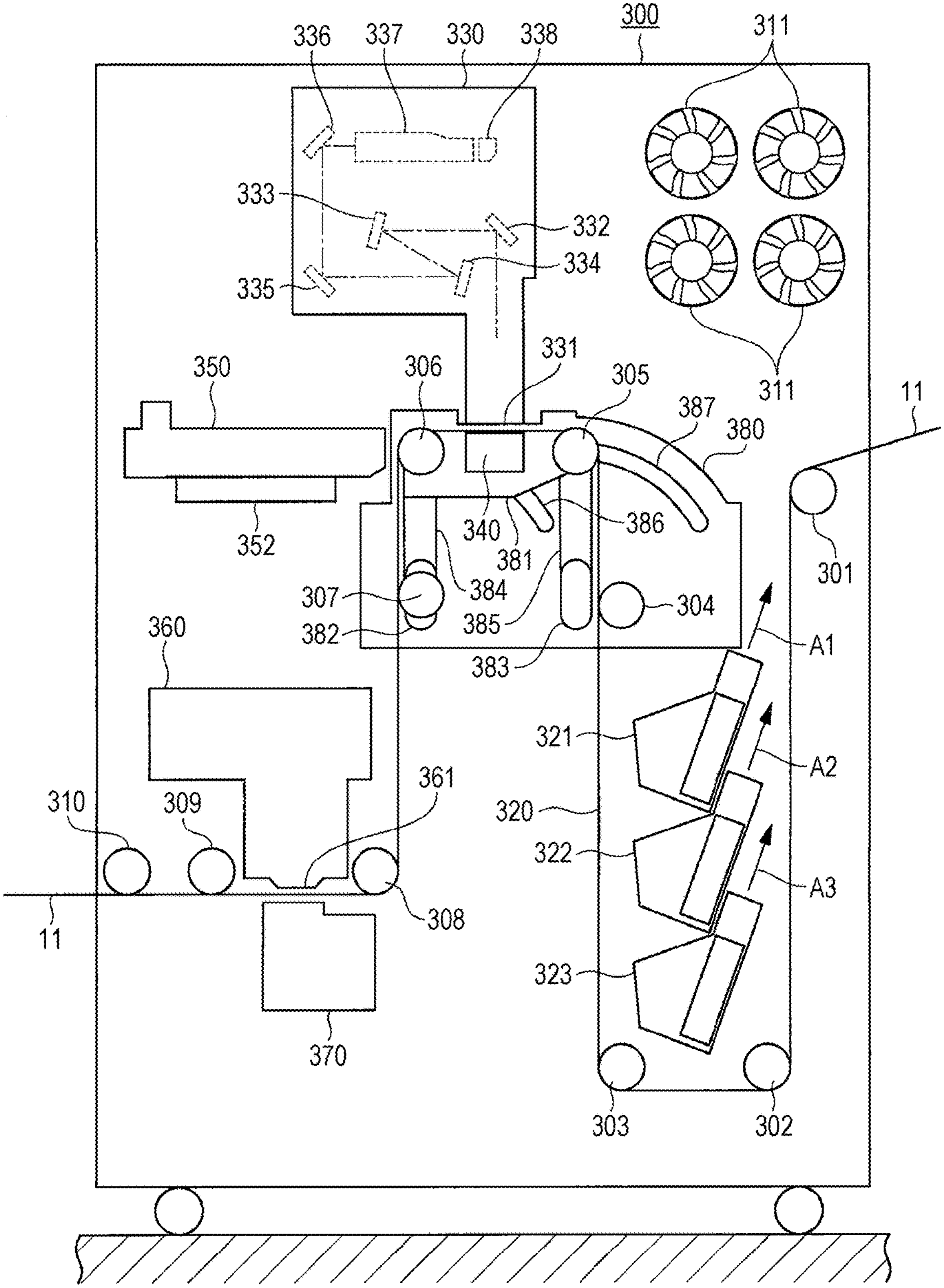
FIG. 1 is a configuration diagram illustrating an example of an image reading device according to an embodiment of the present invention.
Figure 2:
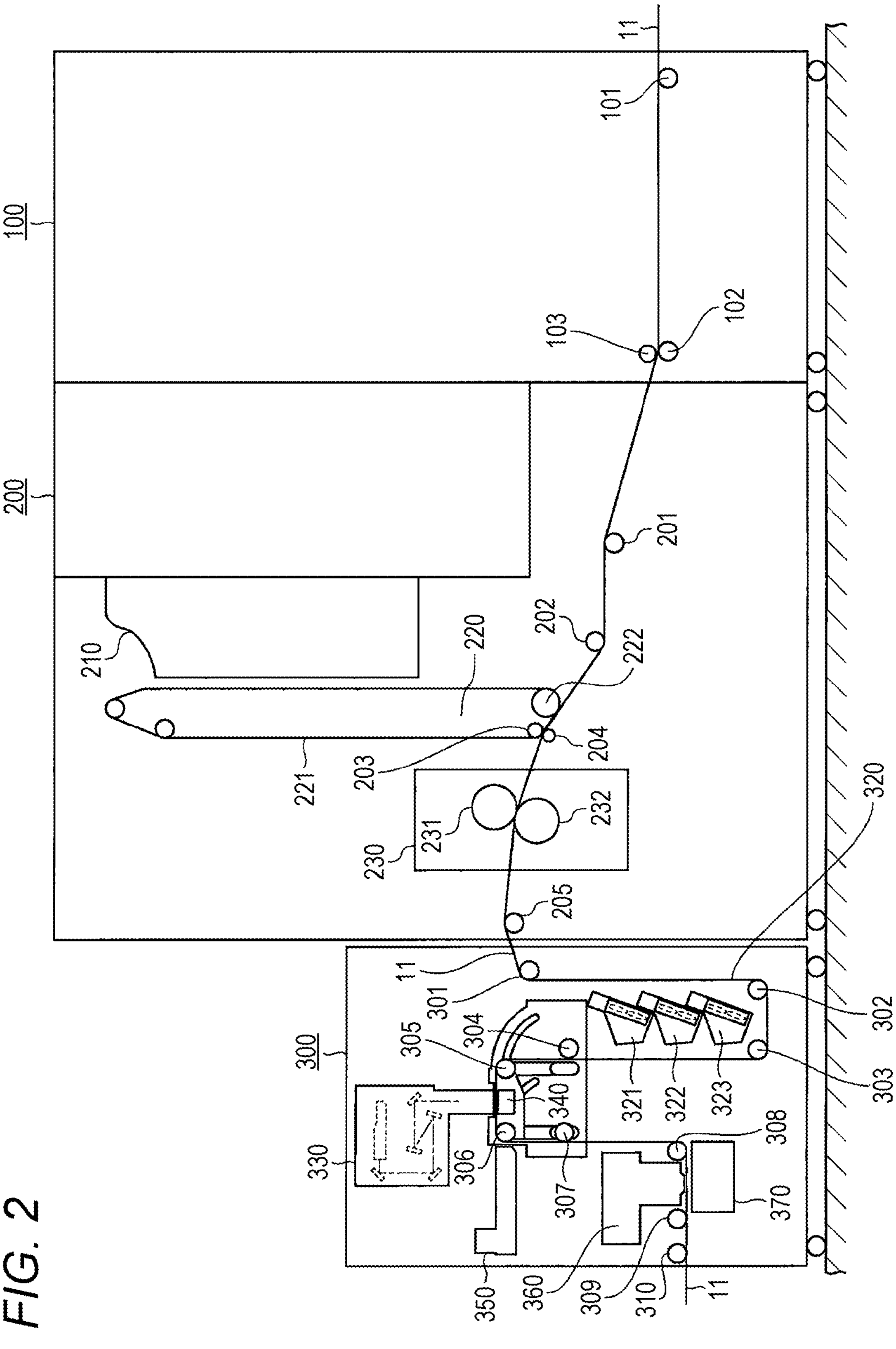
FIG. 2 is a configuration diagram illustrating an example of an entire image forming device to which the image reading device according to an embodiment of the present invention is connected.

FIG. 1 illustrates a configuration of an image reading device of this example, and FIG. 2 illustrates an entire configuration as an image forming device to which the image reading device of this example is connected. FIG. 1 and FIG. 2 illustrate a configuration on a conveyance path of a printing medium on which image formation is performed in each device.

First, before describing an image reading device 300 illustrated in FIG. 1, an entire configuration connected to the image forming device is described with reference to FIG. 2.

In an example illustrated in FIG. 2, a paper feeding device 100, an image forming device 200, and the image reading device 300 are connected in this order from a right side. Note that, an entire system in which the paper feeding device 100 and the image reading device 300 are connected to the image forming device 200 as illustrated in FIG. 2 may be regarded as the image forming device, but in the following description, a single device that performs an image forming step is referred to as the image forming device 200. A continuous printing medium 11, which is a long printing medium mountable on the image forming device 200 of this example, may be a medium formed of paper or a film in various colors other than white in addition to a medium formed of white paper or film. Furthermore, this may also be a medium formed of a transparent or translucent film.

The continuous printing medium 11 drawn out from a supply side roll not illustrated is supplied to the paper feeding device 100, and a plurality of rollers 101 to 103 is arranged on a conveyance path of the continuous printing medium 11. The paper feeding device 100 performs processing of feeding the continuous printing medium 11 to the image forming device 200 at a predetermined speed. Note that, the rollers 101 to 103 serve as guide members of the continuous printing medium 11.

The image forming device 200 is provided with a toner image forming unit 210, a transfer unit 220, and a fixing unit 230 as processing units that form an image former. The toner image forming unit 210 forms toner images in respective colors of yellow Y, magenta M, cyan C, black K, white W, and the like on a transfer belt 221 of the transfer unit 220.

The transfer unit 220 transfers the toner images in the respective colors formed on the transfer belt 221 onto a surface of the continuous printing medium 11 with the transfer roller 222.

The fixing unit 230 is provided with fixing rollers 231 and 232, heats the continuous printing medium 11 by allowing the continuous printing medium 11 to pass between the fixing rollers 231 and 232, thereby fixing a printed image, which is the transferred image, to the continuous printing medium 11. Note that, in the fixing unit 230, the continuous printing medium 11 is heated to, for example, about 100° C.

In the middle of the conveyance path of the continuous printing medium 11 in the image forming device 200, in addition to the transfer roller 222 and the fixing rollers 231 and 232, a plurality of rollers 201 to 205 as guide members is arranged. Note that, only the roller 205 that comes into contact with a back surface side (side opposite to a surface on which the printed image is formed) of the continuous printing medium 11 is arranged on a downstream side in a conveyance direction from the fixing unit 230 of the conveyance path, and a front surface side of the continuous printing medium 11 does not come into contact with the roller. Each of the rollers 201 to 205 is made of, for example, metal. Note that, in the following description, the downstream or upstream is the downstream or upstream as seen in the conveyance direction of the continuous printing medium 11.

The continuous printing medium 11 on which the printed image is formed by the image forming device 200 is sent to the image reading device 300 connected to the image forming device 200.

[Configuration of Image Reading Device]

Next, a configuration of the image reading device 300 is described with reference to FIG. 1.

The image reading device 300 is provided with a cooling unit 320, a scanner unit 330, a shading unit 350, and a colorimeter unit 360. The continuous printing medium 11 passes through these units in order. The scanner unit 330 includes a scanner backing portion 340, and the colorimeter unit 360 includes a colorimeter backing portion 370.

In the middle of the conveyance path of the continuous printing medium 11 in the image reading device 300, a plurality of rollers 301 to 310 as guide members of the continuous printing medium 11 is arranged. Each of the rollers 301 to 310 is made of, for example, metal, and is a guide member that is driven to rotate without including a driving means (that is, a guide member that rotates by movement of the printing medium).

The continuous printing medium 11 conveyed into the image reading device 300 passes through the roller 301 as the guide member, and then passes near the cooling unit 320, which is a cooler that cools the continuous printing medium 11. The roller 301 comes into contact with the back surface side of the continuous printing medium 11 (the side opposite to the surface on which the printed image is formed) and turns the continuous printing medium 11 downward in the conveyance direction.

A plurality of cooling fans 321 to 323 is arranged in the cooling unit 320 to cool the continuous printing medium 11. In FIG. 1, it is configured such that the continuous printing medium 11 is vertically conveyed from an upper side to a lower side, and the conveyed continuous printing medium 11 is cooled by the three cooling fans 321 to 323 arranged vertically. As each of the cooling fans 321 to 323, for example, a type referred to as a sirocco fan in which a plate-shaped blade is attached to a rotating cylinder is used. Alternatively, a fan provided with a propeller may be used as each of the cooling fans 321 to 323.

Each of the cooling fans 321 to 323 is arranged to be obliquely inclined, and is configured to blow air A1, air A2, and air A3 for cooling to the continuous printing medium 11 from obliquely below toward the upstream side of the continuous printing medium 11 to allow the air for cooling to escape above the image reading device 300. A plurality of cooling fans 311 for discharging the air for cooling to the outside of the device is arranged above a housing of the image reading device 300.

Note that, the roller 301 arranged above the cooling unit 320 is located on the side opposite to a path through which the air A1, air A2, and air A3 for cooling pass across the continuous printing medium 11. Therefore, the air A1, air A2, and air A3 for cooling do not pass through an arrangement place of the roller 301, and the roller 301 does not interfere with passage of the air A1, air A2, and air A3 for cooling.

Since the continuous printing medium 11 is heated to about 100° C. by the fixing unit 230 of the image forming device 200 as described with reference to FIG. 2, the continuous printing medium 11 has high temperature of, for example, about 70° C. when this is supplied to the image reading device 300. Therefore, by blowing the air A1, air A2, and air A3 for cooling from the cooling fans 321 to 323, respectively, to the continuous printing medium 11, this is cooled to about normal temperature.

In a case where it is necessary to arrange a plurality of (three) cooling fans 321 to 323 in the conveyance direction to provide a sufficient cooling performance, the conveyance path of the continuous printing medium 11 is arranged vertically and the cooling fans 321 to 323 are arranged vertically (longitudinally) as illustrated in FIG. 1, thereby contributing to downsizing of the image reading device 300. That is, when the conveyance path is horizontally arranged and a plurality of cooling fans is arranged in a horizontal direction, the image reading device 300 is unfavorably enlarged in the horizontal direction correspondingly; however, with the configuration of this example, the image reading device 300 may be downsized.

Note that, although the three cooling fans 321 to 323 arranged in a vertical direction are illustrated in FIG. 1, a plurality of cooling fans may be arranged also in the horizontal direction (direction from the front toward the back in FIG. 1) in a case where a lateral width of the continuous printing medium 11 is wide. For example, a total of nine cooling fans (three in the vertical direction by three in the horizontal direction) may be installed.

On the conveyance path of the continuous printing medium 11, the roller 301 arranged between a place where the continuous printing medium 11 is taken into the image reading device 300 and a place where this is cooled by the cooling unit 320 is arranged so as to come into contact with the back surface of the continuous printing medium 11, that is, the surface on the side opposite to the image forming surface. As described with reference to FIG. 2, the roller 205 arranged on the downstream side from the fixing unit 230 in the image forming device 200 is also arranged so as to come into contact with the back surface of the continuous printing medium 11.

As a result, the image forming surface does not come into contact with the guide member such as the roller until the continuous printing medium 11 heated by the fixing unit 230 of the image forming device 200 is cooled by the cooling unit 320. Therefore, deterioration of the toner image due to contact with the roller of the image formed on the continuous printing medium 11 in a high temperature state may be prevented, and this may contribute to improvement in image quality of the printed image.

Note that, in the configuration in FIG. 1 and FIG. 2, the two rollers 205 and 301 are arranged between the fixing unit 230 and the cooling unit 320, but, if possible, a simpler configuration in which only one of the rollers 205 and 301 is arranged may be adopted.

The continuous printing medium 11 cooled by the cooling unit 320 is conveyed upward by the rollers 302 and 303, which are two guide members, further passes through the rollers 304 and 305, which are other guide members, and is conveyed horizontally in an upper portion in the image reading device 300. The scanner unit 330 is arranged near the surface of the horizontally conveyed continuous printing medium 11. Note that, although FIG. 1 illustrates an example in which a plurality of guide members is arranged on the conveyance path from the cooling unit 320 to the scanner unit 330, it is sufficient to arrange at least one guide member. The guide member (roller) on the conveyance path after the cooling unit 320 may come into contact with either the front surface or the back surface of the continuous printing medium 11. Even when the guide member comes into contact with the surface of the continuous printing medium 11, the continuous printing medium 11 is already cooled to normal temperature, so that deterioration of the printed image does not occur.

The scanner unit 330 is one of readers included in the image reading device 300.

In the scanner unit 330 illustrated in FIG. 1, image light that enters the unit from a paper proximity surface 331 is reflected by a plurality of mirrors 332 to 336, then passes through an optical system 337, and forms an image on an image sensor 338. Then, the image recorded on the continuous printing medium 11 is read by the image sensor 338. The image sensor 338 may be formed by, for example, a charge coupled device (CCD) type line sensor. Alternatively, the image sensor 338 may be formed by a complementary metal oxide semiconductor (CMOS) type sensor. An image sensor that is not the line sensor may also be used.

Data of the image read by the scanner unit 330 is supplied to an image inspection processing unit not illustrated, and inspection processing such as whether the image formed by the image forming device 200 is the same as an original is performed.

Note that, by forming an image on the image sensor 338 in a state in which there is a certain optical path length in the scanner unit 330 as illustrated in FIG. 1, a range in which an image may be correctly formed on the image sensor 338 may be widened. Therefore, according to the configuration illustrated in FIG. 1, the image formed on the surface of the continuous printing medium 11 may be correctly read by the image sensor 338.

The scanner backing portion 340 including a background plate in white and the like is arranged on the side opposite to the paper proximity surface 331 of the scanner unit 330 across the continuous printing medium 11.

The scanner backing portion 340 is attached to a roller holding member 381. The roller holding member 381 is a member that holds two rollers 305 and 306 arranged on an upstream side and a downstream side of the scanner unit 330. The roller holding member 381 is connected to two legs 384 and 385 rotatable about rotation fulcrums 382 and 383, respectively. The conveyance path of the continuous printing medium 11 may be separated from the scanner unit 330 by rotating the legs 384 and 385 along guide grooves 386 and 386 bent in a circular shape.

When the conveyance path of the continuous printing medium 11 is separated from the scanner unit 330 by movement of the roller holding member 381, the scanner backing portion 340 attached to the roller holding member 381 also moves in conjunction therewith.

A shading unit 350 is arranged beside the roller holding member 381 (left side in FIG. 1). The shading unit 350 may move in the horizontal direction (right and left direction in FIG. 1) by driving by a moving unit 352. The shading unit 350 may be moved to a position directly below the scanner unit 330 in a state in which the roller holding member 381 moves away from the scanner unit 330.

The continuous printing medium 11 that passes through the scanner unit 330 is vertically conveyed downward by the roller 306 and is again put into the conveyance state in the horizontal direction by the roller 308.

The colorimeter unit 360 is arranged near the surface (upper surface) of the continuous printing medium 11 that is conveyed in the horizontal direction by the roller 308.

The colorimeter unit 360 is one of the readers included in the image reading device 300.

A colorimeter is built in the colorimeter unit 360, and colorimetry processing of measuring a color of a specific place of the continuous printing medium 11 is performed. For example, a color of the image read by the scanner unit 330 is calibrated based on a colorimetric result by the colorimeter.

The colorimeter backing portion 370 including a background plate in white and the like is arranged on the side opposite to a paper proximity surface 361 of the colorimeter unit 360 across the continuous printing medium 11.

The continuous printing medium 11 that passes through the colorimeter unit 360 is conveyed to the outside of the image reading device 300 via the rollers 309 and 310 and wound as a winding roll not illustrated.

[Variation]

Note that, in the embodiment described above, an image is formed on a long continuous printing medium, and the printing medium on which the image is formed is read. In contrast, the present invention may also be applied to an image forming device or an image reading device that forms an image on a printing medium such as paper or a film cut into a prescribed size for each sheet and reads the printing medium on which the image is formed.

A configuration that performs image reading as a scanner unit 330 illustrated in FIG. 1 also is an example, and the image reading may also be performed by a sensor having another configuration. For example, it may be configured to read an image by a scanner having a configuration in which a line sensor is arranged on a paper proximity surface 331 without using an optical system such as a lens.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:

a conveyance path that conveys a continuous printing medium, an image former that is arranged in a first place in the middle of the conveyance path, forms an image on one surface of the continuous printing medium, and fixes the formed image by heating, a cooler that is arranged in a second place downstream in a conveyance direction from the first place in the middle of the conveyance path, and cools the continuous printing medium by blowing air for cooling to the continuous printing medium, the cooler being configured to blow the air without being in contact with the one surface of the continuous printing medium on which the image is formed, the conveyance path in the second place being different in a conveyance direction from the conveyance path in the first place; and a reader that is arranged in a third place downstream in the conveyance direction from the second place in the middle of the conveyance path, and reads the image formed on the continuous printing medium by the image former, and a guide member that changes the conveyance direction of the continuous printing medium between the first place and the second place of the conveyance path in a manner that the continuous printing medium is vertically conveyed from an upper side to a lower side and the one surface on which the image is formed is conveyed vertically and simultaneously cooled by the blowing air, wherein the guide member does not come into contact with the one surface being formed with the image and comes into contact with the other surface not being formed with the image.

2. The image forming device according to claim 1, wherein the reader is an image sensor that reads the image formed on the continuous printing medium, and a colorimeter that measures a color of the image formed on the continuous printing medium is arranged in a fourth place downstream in the conveyance direction from the third place of the conveyance path in which the reader is arranged.

3. The image forming device according to claim 2, wherein a guide member that conveys the continuous printing medium is also provided between the third place of the conveyance path in which the reader is arranged and the fourth position of the conveyance path in which the colorimeter is arranged.

4. The image forming device according to claim 1, wherein the guide member is formed by a roller made of metal.

5. The image forming device according to claim 1, wherein the air for cooling blown from the cooler escapes to an upstream side in the conveyance direction of the conveyance path that conveys the continuous printing medium.

6. The image forming device according to claim 5, wherein a guide member of the conveyance path is not arranged on a path through which the air for cooling blown from the cooler escapes.

7. The image forming device according to claim 1, wherein a guide member that comes into contact with the one surface of the continuous printing medium is provided between the second place of the conveyance path in which the cooler is arranged and the third place of the conveyance path in which the reader is arranged.

8. The image forming device according to claim 1, wherein the guide member is formed by a roller driven in conjunction with conveyance of the continuous printing medium.

9. The image forming device according to claim 1, wherein between the first place and one or more fans, one or a plurality of guide members that comes into contact with the other surface of the printing medium is provided, and a guide member that comes into contact with the one surface of the printing medium is not provided.

10. The image forming device according to claim 1, wherein the continuous printing medium is vertically conveyed from the lower side to the upper side after cooling by the blowing air at the second place.

11. The image forming device according to claim 10, wherein the continuous printing medium is guided from the lower side to the upper side by other guide member while the other guide member comes into contact with the one surface after cooling by the blowing air at the second place.

12. The image forming device according to claim 1, wherein the cooler includes one or more fans, the one or more fans configured to blow the air toward the continuous printing medium.

* * * * *